United States Patent [19]

Stueben et al.

[11] 4,165,266

[45] Aug. 21, 1979

[54] RADIATION CURABLE PRESSURE SENSITIVE ADHESIVE COMPOSITIONS

[75] Inventors: Kenneth C. Stueben, Bridgewater; Raymond G. Azrak, Whitehouse Station; Michael F. Patrylow, Piscataway, all of N.J.

[73] Assignee: Union Carbide Corporation, New York, N.Y.

[21] Appl. No.: 782,957

[22] Filed: Mar. 30, 1977

[51] Int. Cl.² ............................ C08F 8/00; C08F 261/06
[52] U.S. Cl. .................................. 204/159.15; 427/44; 427/54; 427/207 B; 428/483
[58] Field of Search ............... 260/885; 204/159.15; 427/44, 54, 207 B

[56] References Cited

U.S. PATENT DOCUMENTS

| | | | |
|---|---|---|---|
| 2,861,899 | 11/1958 | Sylvester et al. | 427/207 B |
| 3,628,987 | 12/1971 | Nakata et al. | 260/876 B X |
| 3,657,396 | 4/1972 | Kuramoto et al. | 427/207 B X |
| 3,661,618 | 5/1972 | Brookman et al. | 427/207 B X |
| 3,940,535 | 2/1976 | Gaeth et al. | 427/44 X |

FOREIGN PATENT DOCUMENTS 886003 of 1962 United Kingdom.

*Primary Examiner*—Richard B. Turer
*Attorney, Agent, or Firm*—Francis M. Fazio

[57] ABSTRACT

Compositions comprising poly (vinyl alkyl ether), a liquid monoacrylate monomer and photoinitiator cure upon exposure to radiation to form pressure sensitive adhesives having an excellent balance of peel strength, shear time, and quick stick.

15 Claims, 1 Drawing Figure

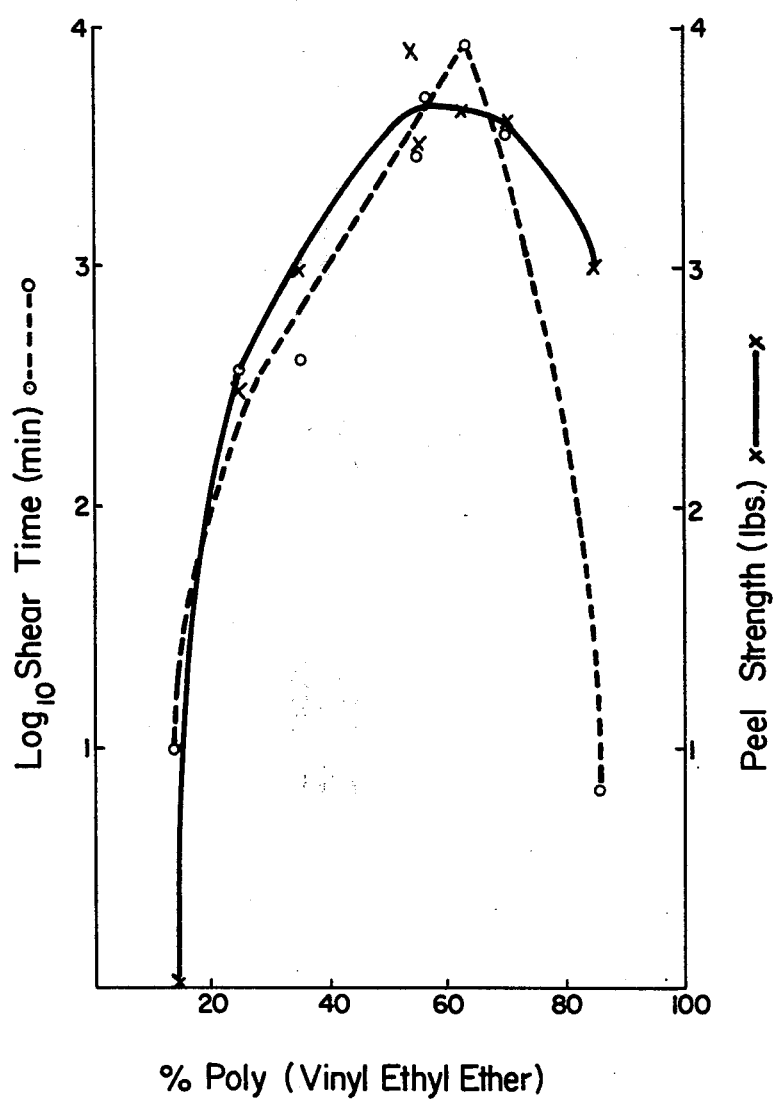

4,165,266

RADIATION CURABLE PRESSURE SENSITIVE ADHESIVE COMPOSITIONS

BACKGROUND OF THE INVENTION

In recent years, the increasing desire to reduce toxic pollutants in work environments has prompted adhesives manufacturers to seek elimination of volatile solvents from adhesive compositions. Moreover, elimination of volatile solvents is desirable to reduce energy consumption, since considerable heat energy is required to evaporate volatile solvents when curing the composition.

Radiation curable adhesive compositions have been developed which contain no volatile solvents, but rather contain substituents which react upon exposure to radiation to become incorporated into the cured adhesive.

It is important that the cured adhesive composition has properties which are tailored to its intended end use. The pressure sensitive adhesives area is particularly demanding in terms of the properties required for commercial utility. In pressure sensitive adhesives applications (e.g. pressure sensitive adhesive tapes) it is frequently required that the adhesive composition have a good balance of peel strength and shear strength. Peel strength is a measure of the adhesivity of the composition, that is, how strongly it bonds to other materials. Shear strength is a measure of cohesivity of the composition, that is, its internal strength and resistance to plastic deformation.

A pressure sensitive adhesive may have high peel strength but poor shear strength, in which case it will tend to creep under shear loading. Another problem may exist wherein a pressure sensitive adhesive has a high degree of internal cohesion but is too hard and inflexible and not sufficiently adherent to be useful in many pressure sensitive adhesive applications. In such a case, a pressure sensitive adhesive tape may undergo an erratic type of failure in which the adhesive tape, upon being pulled away from the applied surface, releases in a series of jerks, rather than peeling away from the surface in a smooth, continuous motion. This type of failure is commonly called "zip" failure. Another problem associated with a poor balance of adhesivity and cohesivity is "adhesive transfer," which is the tendency of an adhesive on an adhesive tape to transfer from its backing material to the applied surface when the tape is peeled away from the applied surface.

While a pressure sensitive adhesive having high peel strength alone or high sheer strength alone may have utility in certain specific end uses, a pressure sensitive adhesive having a good balance of peel strength and shear strength generally has a much broader scope of utility.

Obtaining a desirable balance of properties in radiation curable pressure sensitive adhesive compositions has been a problem in the prior art. It has been found that some inherently tacky polymers with a low degree of cohesion can be crosslinked by exposure to actinic radiation, thus improving cohesion. However, we have observed that it is difficult or impossible to obtain an adhesive having a good balance of properties in this manner. Moreover, the tacky polymer usually has a viscosity such that it cannot be applied as a thin film at room temperature without the addition of solvents.

In our copending application, Ser. No. 673,801, we described a radiation curable adhesive composition comprising, as the major substituent, poly(vinyl alkyl ether) having admixed therewith from 3 to 40 weight percent of a multifunctional acrylate compound, and, optionally, up to 25 weight percent of a monofunctional acrylate compound and a photoinitiator. When cured by exposure to radiation, these compositions exhibited an excellent balance of adhesive properties. It was found that the multifunctional acrylate, which is highly reactive in the presence of actinic radiation and a photoinitiator, reacted to impart crosslink density, and thereby good cohesion, to the radiation cured composition. This increased cohesion was achieved without a concomitant loss of adhesion such as had been observed upon irradiation of poly(vinyl alkyl ether) alone in a conventional solvent medium.

In addition to the above mentioned properties desired in a pressure sensitive, it is usually also desirable that the adhesive exhibit a reasonable degree of "quick stick," that is, the property of adhering on contact without the external application of pressure.

Yet another desirable property in a pressure sensitive adhesive is that the adhesive, in the uncured state, have a viscosity such that it can easily be applied by conventional coating techniques.

While the radiation curable compositions of our previously mentioned copending application exhibit a good balance of pressure sensitive adhesive properties when cured, it is always desirable to develop new radiation curable pressure sensitive adhesive compositions having a good balance of adhesive properties.

SUMMARY OF THE INVENTION

We have now discovered that when poly(vinyl alkyl ether) or a copolymer thereof, a liquid monoacrylate monomer, and a photoinitiator are admixed in certain critical proportions, as described herein, the resultant composition cures upon exposure to actinic radiation to form a pressure sensitive adhesive having an excellent balance of peel strength, shear time, and quick stick. This was totally unexpected and nonobvious. Without the presence of a multi-functional compound it was to be expected that the only mechanism which could occur to provide cohesivity to the cured composition was the self-crosslinking of the poly(vinyl alkyl ether) and the experience of the prior art would lead one to believe that such crosslinking would be accompanied by poor adhesivity. However, when the substituents described herein are used in the critical proportions, we have found that both good peel strength and good shear time occur in the resultant cured adhesive.

An advantage of the radiation curable adhesive compositions of this invention is that the critical proportions of substituents which provide the excellent balance of pressure sensitive adhesive properties have a viscosity in the uncured state such that they can easily be applied as films whithout the necessity of adding diluents or other viscosity regulators.

BRIEF DESCRIPTION OF THE DRAWING

The single FIGURE, hereinafter discussed in detail, is a graph in which a first curve is shown which plots peel strength of the cured pressure sensitive adhesive as a function of poly(vinyl ethyl ether) concentration in the composition; and a second curve is shown which plots $\log_{10}$ of the shear time of the cured adhesive as a function of poly(vinyl ethyl ether) concentration in the composition.

DETAILED DESCRIPTION OF THE INVENTION

The radiation curable pressure sensitive adhesive composition of this invention comprises an admixture of:
(a) from 20 to 70 weight percent, preferably from 35 to 50 weight percent of a liquid monoacrylate monomer having an inherent viscosity of less than about 1850 cps. at 25° C.;
(b) from 30 to 80 weight percent, preferably from 50 to 65 weight percent of a poly(vinyl aklyl ether); and
(c) from 0 to 10 weight percent, preferably from 1 to 5 weight percent, and most preferably from 2 to 3 weight percent of a photoinitiator.

The poly(vinyl alkyl ether) employed is one in which the alkyl portion of the repeating unit contains from one to four carbon atoms. The poly(vinyl alkyl ether) has a reduced viscosity from about 0.1 to about 0.8, preferably from 0.2 to 0.6, measured at a concentration of 0.1 gram of resin per 100 ml. of benzene at 20° C. From a standpoint of producing a composition having a good balance of adhesive properties, that is, peel strength, shear time, and quick stick, poly(vinyl ethyl ether) is the preferred poly(vinyl alkyl ether).

If desired, the poly(vinyl alkyl ether) can have copolymerized therewith up to about 50 weight percent, based on the total weight of the copolymer, of a different ethylenically unsaturated monomer (i.e. a monomer containing the group $>C=C<$) which is capable of undergoing addition type copolymerization with vinyl alkyl ether. Suitable monomers are ethylene, vinyl chloride, vinylidene chloride, vinyl acetate, and maleic anhydride.

The liquid monoacrylate monomers which can be employed in the composition are any of the known radiation responsive monoacrylate monomers having a viscosity as aforesaid. While there is no strict lower limit on the viscosity of the liquid monoacrylate monomer, it is preferred not to employ one having a viscosity lower than 5 cps. at 25° C., since these tend to be somewhat volatile at room temperature. As used herein, the term "monoacrylate monomer" refers to compounds which can be represented by the formula

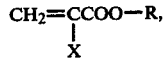

wherein X is hydrogen or methyl and R can be unsubstituted or substituted alkyl, cycloalkyl, alkenyl, aryl, or aralkyl, wherein the substituent can be alkoxy, hydroxy, cyano, or amino, or R can be carbamyloxy alkyl which can be N-(monoalkyl) substituted.

One can mention, as illustrative of such compounds: alkyl acrylates having up to about 12 carbons in the alkyl segment such as ethyl acrylate, butyl acrylate, 2-ethylhexyl acrylate, amyl acrylate, n-lauryl acrylate, nonyl acrylate, n-octyl acrylate, isooctyl acrylate, isodecyl acrylate and the like; alkoxy alkyl acrylates such as methoxybutyl acrylate, ethoxyethyl acrylate, ethoxypropyl acrylate, and the like; hydroxyalkyl acrylates such as hydroxyethyl acrylate, hydroxybutyl acrylate and the like; alkenyl acrylates, such as trimethoxyallyloxymethyl acrylate and allyl acrylate; aralkyl acrylates such as phenoxyethyl acrylate and benzyl acrylate; cycloalkyl acrylates such as cyclohexyl acrylate, cyclopentyl acrylate and isobornyl acrylate; aminoalkylacrylates such as diethylaminoethyl acrylate; cyanoalkyl acrylates such as cyanoethyl acrylate and cyanopropyl acrylate; and compounds obtained by substituting methacrylyl groups for the acrylyl groups of the foregoing compounds. Also useful as the liquid monoacrylate monomers of this invention are the carbamyloxy alkyl acrylates and methacrylates, wherein the nitrogen atom may or may not be monoalkyl substituted. Illustrative thereof one can mention N-methyl-carbamyloxy methyl acrylate, N-methyl-carbamyloxy methyl methacrylate, N-ethyl-carbamyloxy methyl acrylate, N-ethylcarbamyloxy methyl methacrylate, 2-carbamyloxy ethyl acrylate, 2-carbamyloxy ethyl methacrylate, N-methyl-2-carbamyloxy ethyl acrylate, N-methyl-2-carbamyloxy ethyl methacrylate, N-ethyl-2-carbamyloxy ethyl acrylate, N-ethyl-2-carbamyloxy ethyl methacrylate, 2-carbamyloxy propyl acrylate, 2-carbamyloxy propyl methacrylate, 2-carbamyloxy propyl methacrylate, and the like. Preferred liquid monoacrylate monomers are isobornyl acrylate and N-methyl-2-carbamyloxy ethyl acrylate.

The foregoing list of liquid monoacrylate monomers useful in the composition of this invention is meant to be illustrative only and is not intended to exclude any other liquid monoacrylate monomers known to those skilled in the art as being useful in photocurable compositions as previosuly described.

When non-ionizing radiation is used, there is present in the radiation curable pressure sensitive adhesive composition a photoinitiator at a concentration up to about 10 weight percent, preferably from about 1 to about 5 weight percent, and most preferably from 2 to 3 weight percent. The photoinitiators which may be used are well known to those skilled in the art and require no further description for them to know what they are. Nevertheless, one can mention as illustrative of suitable photoinitiators, 2,2-diethoxyacetophenone, 2,2-dimethyoxyphenoxyacetophenone, 2- or 3- or 4-bromoacetophenone, 3- or 4-bromoacetophenone, 3- or 4-allylacetophenone, 2-acetonaphthone, benzaldehyde, benzoin, the allyl benzoin ethers, benzophenone, benzoquinone, 1-chloroanthraquinone, p-diacetyl-benzene, Michler's Ketone, p-methoxybenzophenone, dibenzosuberone, 4,4-dichlorobenzophenone, 1,3-diphenyl-2-propanone, fluorenone, 1,4-naphthyl-phenylketone, 2,3-pentanedione, prppiophenone, chlorothioxanthone, 2-methylthioxanthone xanthone and the like, or any mixtures of these. We prefer to use benzophenone as the photoinitiator. The foregoing list is meant to be illustrative only and is not meant to exclude any suitable photoinitiators known to those skilled in the art.

Those skilled in the art of photochemistry are fully aware that photoactivators can be used in combination with the aforementioned photoinitiators and that synergistic effects are sometimes achieved when such combinations are used. Photoactivators are well known to those skilled in the art and require no further description for them to know what they are. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethylenimine, piperdine, N-methylpiperazine, 2,2-dimethyl-1,3-bis-(3-N-morpholinyl) propionyloxy)) propane, and the like, or any combination of these. The photoactivators, when used, are employed in the usual effective amounts which are known to those skilled in the art.

The foregoing components are combined in any manner suitable for achieving a uniform composition. When the components have been mixed, they can be applied to a substrate by any means suitable for the application of adhesive films, such as, for example, reverse roll coating, curtain coating, brushing, or coating with a doctor knife.

The viscosities of the uncured pressure sensitive adhesive compositions of this invention vary, depending on the particular formulation used, however, the viscosity is preferably such that the composition can be applied as a film at room temperature without the necessity of adding diluents or other viscosity regulators. Generally, higher concentrations of poly(vinyl alkyl ether) lead to higher viscosity.

The applied composition can be cured by the known radiation curing methods such as exposure to ultraviolet or electron beam radiation. The cured compositions of this invention exhibit excellent adhesion to a variety of substrates including, but not limited to, steel, aluminum, glass and thermoplastics. Moreover, they show an excellent balance of adhesive properties, such as peel strength, quick stick and shear time, as illustrated in the examples below. Irradiation of the composition can be performed using any of the known and commonly available types of radiation curing equipment. For example, curing may be done by low, medium or high pressure mercury lamps or with a swirlflow plasma arc radiation source by the process disclosed in U.S. Pat. No. 3,650,699. Curing may be carried out in an air atmosphere or in an inert gas atmosphere, such as nitrogen or argon. Exposure time required to cure the composition varies with inter alia, the formulation, type and wavelength of radiation, energy flux, concentration of photoinitiator, film thickness and nature of the surrounding atmosphere (e.g. air or inert gas such as $N_2$). Those skilled in the art of radiation technology will be able to determine the proper curing time for any particular composition. Generally, cure time is rather short, that is, less than 10 seconds. As will be seen in more detail in the working examples below, the concentration of photoinitiator (when using non-ionizing radiation) required to give the best balance of pressure sensitive adhesive properties varies with the relative concentrations of poly(vinyl ethyl ether) and monoacrylate monomer. In view of the disclosures herein, and particularly with a view toward the working examples presented below, one having ordinary skill in the art will be able to determine the optimum photoinitiator concentration and cure time for any given proportions of poly(vinyl alkyl ether) and monoacrylate without undue experimentation.

In a typical use, the uncured composition of this invention is applied to a polymeric tape substrate, such as polyethylene terephthalate, the composition is radiation cured on the tape, and the tape having the cured composition on its surface is used as a pressure sensitive adhesive tape.

The examples which follow further illustrate the invention described herein and particularly illustrate the criticality of the concentrations in which the poly(vinyl alkyl ether) and liquid monoacrylate monomer are employed in the composition of this invention.

Adhesive properties of the cured compositions of this invention were determined by standard test procedures of the Pressure Sensitive Tape Council. Peel strength was measured by the procedure designated PSTC-1, quick stick by PSTC-5 and shear time by PSTC-7, with the exception that the shear test was modified to use a ½-in. by ½-in. test area, except where otherwise indicated in the examples, and cold rolled steel Q-panels were used in place of chrome plated steel in the peel test. In the examples, the poly(vinyl ethyl ether) employed except where otherwise indicated, had a reduced viscosity of about 0.3, measured at a concentration of 0.1 grams of resin per 100 ml. of benzene at 20° C. and contained 0.5% monotertiary butylhydroquinone stabilizer.

EXAMPLE 1

This example illustrates the excellent balance of adhesive properties obtainable in the cured compositions of this invention and the criticality of the concentrations of poly(vinyl alkyl ether) and liquid monoacrylate monomer in the obtainment of such properties. The example had as its primary objective to determine the optimum peel strength and shear time combination for radiation cured pressure sensitive adhesive compositions having varying concentrations of poly(vinyl alkyl ether) and N-methyl-2-carbamyloxy ethyl acrylate, without regard to photoinitator level or exposure time.

A series of radiation curable compositions were prepared, each of which consisted of poly(vinyl alkyl ether), N-methyl-2carbamyloxy ethyl acrylate, and benzophenone in varying concentrations as shown in Table 1.

A total of 14 different formulations, representing 4 different ratios of poly(vinyl ethyl ether)/monoacrylate monomer, were prepared having substituent concentrations within the scope of this invention. Additionally, there were prepared four control compositions, labelled C1–C5 which contained all the substituents of the compositions of our invention, but at concentration levels not within the critical ranges specified herein.

The compositions were prepared by placing the poly(vinyl ethyl ether), benzophenone, and N-methyl-2-carbamyloxy ethyl acrylate in a brown jar, allowing the benzophenone to dissolve, heating at 65° C. for 10 minutes and mixing thoroughly with an electric mixer to obtain a uniform composition, and allowing the blended mixture to cool to room temperature.

Each of the compositions thus prepared was applied to strips of polyethylene terephthalate tape using a No. 28 wire wound rod and allowed to stand until the composition formed a smooth, level coating on the substrate. The radiation curable coatings on the substrates were cured by exposure in air to ultraviolet light from three 2.2-Kw, medium pressure mercury arc lamps, each 24 inches in length, having a total delivered flux of 500 watts/ft.$^2$. The irradiated, adhesive-coated substrates were tested for peel strength, shear time, and, in some instances quick stick. The results appear in Table 1.

The data of Table 1 were examined to determine the optimum peel/shear combination for each ratio of poly(vinyl ethyl ether)/monoacrylate monomer, which appears in Table 2. Referring to the FIGURE, the optimum peel and shear values shown in Table 2 are plotted as functions of the poly(vinyl ethyl ether) concentration. For convenience of presentation, the shear value is plotted as log (base 10) of the shear time in minutes.

The FIGURE graphically illustrates the totally unexpected and nonobvious properties of the cured compositions of this invention. When the optimizing amount of radiation exposure and photoinitiator are employed for each formulation, there is observed a remarkably synchronous sharp peaking of the peel and shear curves in the range of critical proportions. As previously mentioned, this result was totally unexpected since, with no multi-functional crosslinker present, one would have expected to obtain cohesion in the cured composition only through self-crosslinking of the poly(vinyl alkyl ether), a phenomenon which has been associated with loss of adhesivity in the prior art.

It should be noted that virtually no commercially acceptable shear times were obtained for cured compositions with an 85/15 weight ratio of poly(vinyl ethyl ether)/N-methyl-2-carbamyloxy ethyl acrylate. While reasonably balanced peel and shear were obtained for the 25/75 and 15/85 composition, both peel and shear values were not as good as in the critical range hereinbefore defined and the values fell off rather sharply outside that range.

It is noted that, in plotting the graph, the average of two "optimum" peel and shear values were used for the 55% composition, since 6 seconds of exposure gave somewhat better peel, but lower shear values than 8 seconds of exposure for a 2.5% benzophenone concentration. It is also noted that the % poly(vinyl ethyl ether) indicated in the table is based on total weight of the poly(vinyl ethyl ether) and N-methyl-2-carbamyloxy ethyl acrylate.

Table 1.

| Composition[a] | Exposure Sec. | Peel (lbs./in)[b] | Quick Stick (lbs./in.) | Shear Time (hrs:min.) |
|---|---|---|---|---|
| C1 | 6 | 2.2 | 1.25 | 0:01 |
| " | 8 | 1.4 | 0.95 | 0:04 |
| " | 10 | 1.45 | 0.85 | 0:02 |
| C2 | 6 | 2.1 | 1.55 | 0:01 |
| " | 8 | 2.45 | 0.75 | 0:05 |
| " | 10 | 2.7 | 1.5 | 0.09 |
| C3 | 6 | 2.8 | 1.25 | 0:01 |
| " | 8 | 3.1 | 1.45 | 0:04 |
| " | 10 | 3.0 | 1.25 | 0:07 |
| 1 | 6 | 1.5 | 0.9 | 0:01 |
| " | 8 | 1.65 | 1.05 | 0:09 |
| " | 10 | 1.95 | 0.75 | 0:09 |
| 2 | 6 | 3.0 | 0.9 | 0:49 |
| " | 8 | 2.6 | 1.2 | 0.03 |
| " | 10 | 2.3 | 1.05 | 1:03 |
| 3 | 6 | 3.2 | 0.6 | 1:22 |
| " | 8 | 3.2 | 0.8 | 1:33 |
| " | 10 | 3.5 | 1.15 | 0:35 |
| 4 | 6 | 3.6 | | 0:36 |
| 4 | 6 | 3.6 | | 0:36 |
| " | 8 | 3.4 | | 3:1 |
| " | 10 | 3.3 | 2:45 | |
| 5 | 6 | 3.65 | | 1:5 |
| " | 8 | 3.7 | | 0:15 |
| " | 10 | 3.6 | | 64:45 |
| 6 | 6 | 3.7 | | 1:45 |
| " | 8 | 3.8 | | 4:01 |
| " | 10 | 3.5 | | 1:36 |
| 7 | 6 | 2.6 | | 0:27 |
| " | 8 | 2.2 | | 1:20 |
| " | 10 | 3.4 | | 5:02 |
| 8 | 6 | 3.65 | | >140:00 |
| " | 8 | 3.4 | | >115:00 |
| " | 10 | zip | | 22:58 |
| 9 | 6 | 2.15 | 1.1 | 0:15 |
| " | 8 | 2.9 | 0.7 | 1:0 |
| " | 10 | 3.05 | 1.4 | 0:03 |
| 10 | 6 | 3.3 | 0.9 | 0:26 |
| " | 8 | 3.45 | 0.6 | 0:24 |
| " | 10 | 3.4 | 0.6 | 15:40 |
| 11 | 6 | 3.85 | | 48:15 |
| " | 8 | 3.5 | | 77:30 |
| " | 10 | 3.6 | | 10:50 |
| 12 | 6 | 3.6 | | 2:47 |

Table 1.-continued

| Composition[a] | Exposure Sec. | Peel (lbs./in)[b] | Quick Stick (lbs./in.) | Shear Time (hrs:min.) |
|---|---|---|---|---|
| " | 8 | 3.7 | | >30:00 |
| " | 10 | zip | | >140:00 |
| 13 | 6 | 2.3[d] | | 23:03 |
| " | 8 | zip | | 6:33 |
| " | 10 | zip | | 64.15 |
| 14 | 6 | 3.0[c] | | 7:00 |
| " | 10 | zip | | >74:00 |
| C4 | 4 | 2.5 | | 6:30 |
| " | 6 | zip | | >50:00 |
| " | 6 | 2.25 | | 3:10 |
| " | 10 | zip | | 0:20 |
| C5 | 6 | 0 | | 0:10 |

[a]Compositions in parts by wt. (Poly (vinyl ethyl ether/N-methyl-2-carbamyloxy ethyl acrylate/benzophenone)
C1 = 85/15/1.5
C2 = 85/15/2.0
C3 = 85/15/2.5
C4 = 25/75/2.0
C5 = 15/85/2.0
1 = 70/30/1.5
2 = 70/30/2.0
3 = 70/30/2.5
4 = 70/30/2.75
5 = 70/30/3.0
6 = 62.5/37.5/2.5
7 = 62.5/37.5/2.75
8 = 62.5/37.5/3.0
9 = 55/45/1.5
10 = 55/45/2.0
11 = 55/45/2.5
12 = 55/45/2.75
13 = 55/45/3.0
14 = 35/65/2.0
[b]Failure was cohesive unless otherwise indicated
[c]Failure was adhesive off steel with metal stain
[d]Failure was adhesive off steel, no stain Table 2

| | Best Peel/Shear Values | | | |
|---|---|---|---|---|
| Composition[a] | B$_2$P[b] | Exposure (sec.) | Peel Strength,(lbs.) | Shear Time (hrs:min.) |
| 85/15 | 2.5 | 10 | 3.0 | 0:07 |
| 70/30 | 3.0 | 10 | 3.6 | 64:45 |
| 62.5/37.5 | 3.0 | 6 | 3.65 | >140:00 |
| 55/45 | 2.5 | 6 | 3.85 | 48:15 |
| 55/45 | 2.5 | 8 | 3.5 | 77:30 |
| 35/65 | 2.0 | 6 | 3.0 | 7:00 |
| 25/75 | 2.0 | 4 | 2.5 | 6:30 |
| 15/85 | 2.0 | 6 | 0 | 0:10 |

[a]p.b.w. poly(vinyl ethyl ether)/N-methyl-2-carbamyloxy ethyl acrylate
[b]benzophenone, p.b.w.

EXAMPLE 2

Using a procedure similar to that of Example 1, there were prepared three radiation curable pressure sensitive adhesive compositions, identified A, B, and C, which contained 62.5 weight percent poly(vinyl ethyl ether), 37.5 weight percent N-methyl-2-carbamyloxy ethyl acrylate, and 3 weight percent benzophenone. However, in compositions B and C, a portion of the poly(vinyl ethyl ether) employed in Example 1 was replaced by a higher molecular weight poly(vinyl ethyl ether) which had a reduced viscosity of 0.56, measured at a concentration of 0.1 grams of resin per 100 ml. of benzene at 20° C. The compositions were applied to polyethylene terephthalate tape substrates and cured in a manner similar to that of Example 1. The peel strengths and shear times of the tapes having the cured compositions on their surfaces were tested. the results appear in the table below.

It can be seen that the use of the higher molecular weight poly(vinyl ethyl ether) in compositions B and C resulted in a cured adhesive having higher shear times. However, zip failure occurred when compositions B and C were cured by 10 second exposures to the ultraviolet radiation.

| Composition[a] | Exposure, (sec.) | Peel Strength, (lbs.) | Shear Time, (hrs:min.) |
|---|---|---|---|
| A | 4 | 3.55 | 19:35 |
| A | 6 | 3.75 | 34:30 |
| A | 10 | 3.7[b] | 25:50 |
| B | 4 | 4.0 | 32:20 |
| B | 6 | 3.45 | >100 |
| B | 10 | zip | >100 |
| C | 4 | 3.45 | >100 |
| C | 6 | 3.95 | >100 |
| C | 10 | zip | >100 |

[a] Wt. % of lower and higher m. wt. poly(vinyl ethyl ether) as follows:
A = 62.5/0
B = 50/12.5
C = 31.25/31.25
[b] Partially zip failure

EXAMPLE 3

Two radiation curable pressure sensitive adhesive compositions were prepared as admixtures of 60 p.b.w. poly(vinyl ethyl ether), 40 p.b.w. isobornyl acrylate and 2 p.b.w. benzophenone. One composition contained the same poly(vinyl ethyl ether) which was used in Example 1 and the other composition contained the higher molecular weight poly(vinyl ethyl ether) that was used in compositions B and C of Example 2. Both compositions were applied to a polyethylene terephthalate tape substrate and cured by exposure to ultraviolet light by a procedure similar to that of Example 1. The composition containing the lower molecular weight poly(vinyl ethyl ether) was cured by 9 seconds of exposure, the other compositions by 6 seconds of exposure. The tape having the cured composition containing the lower molecular weight poly(vinyl ethyl ether) on its surface had a peel strength of 6.8 lb./in. and a shear time of 0.62 hours and the tape having the other cured composition on its surface had a peel strength of 5.2 lb./in. and shear time of 5.9 hours.

EXAMPLE 4

Using the same poly(vinyl ethyl ether) as was used in compositions B and C of Example 2, a composition containing 70 p.b.w. poly(vinyl alkyl ether), 30 p.b.w. 2-ethoxyethyl acrylate and 2 p.b.w. benzophenone was applied to a polyethylene terphthalate tape substrate and cured in a manner similar to that of Example 1, using 8.5 seconds of exposure to the ultraviolet light. The tape having the cured pressure sensitive adhesive composition thereon had a peel strength of 4.5 lb./in. and a shear time of 17 hours.

EXAMPLE 5

Using a procedure similar to that of Example 1, a radiation curable pressure sensitive adhesive composition containing 35 p.b.w. poly(vinyl ethyl ether), 65 p.b.w. cyclohexyl acrylate and 2 p.b.w. benzophenone was prepared, applied to a polyethylene terephthalate tape substrate, and cured using 6 seconds of exposure to the ultraviolet light. The tape having the cured pressure sensitive adhesive thereon had a peel strength of 4.2 lb./in and a shear time of 1.3 hours.

EXAMPLE 6

Using a procedure similar to that of Example 1, two radiation curable pressure sensitive adhesives containing 62.5 p.b.w. poly(vinyl ethyl ether), 37.5 p.b.w. N-methyl-2-carbamyloxy ethyl acrylate, and 3 p.b.w. of a photoinitiator were prepared, applied to a polyethylene terephthalate tape substrate and cured by 6 seconds of exposure to the ultraviolet light. One composition contained p-methoxybenzophenone as the photoinitiator and the other contained dibenzosuberone as the photoinitiator. The tape having the cured p-methoxybenzophenone initiated composition on its surface had a peel strength of 3.6 lb./in. and a shear time of 5 hours. The tape having the cured dibenzosuberone initiated composition on its surface had a peel strength of 3.8 lb./in. and a shear time of 44 hours.

What is claimed is:

1. A radiation curable pressure sensitive adhesive composition comprising:
   (a) from 20 to 70 weight percent of a liquid monoacrylate monomer having an inherent viscosity of less than about 1850 cps. at 25° C.;
   (b) from 30 to 80 weight percent of a poly(vinyl alkyl ether) having from 1 to 4 carbon atoms in the alkyl segment and having a reduced viscosity of from 0.1 to 0.8, measured at a concentration of 0.1 gram of resin per 100 ml. of benzene at 20° C.; and
   (c) from 0 to 10 weight percent of a photoinitiator.

2. A radiation curable pressure sensitive adhesive composition as claimed in claim 1, wherein (a) is present at a concentration of from 35 to 50 weight percent and (b) is present at a concentration of from 50 to 65 weight percent.

3. A radiation curable pressure sensitive adhesive composition as claimed in claim 1, wherein (c) is present at a concentration of from 1 to 5 weight percent.

4. A radiation curable pressure sensitive adhesive composition as claimed in claim 1, wherein (c) is present at a concentration of from 2 to 3 weight percent.

5. A radiation curable pressure sensitive adhesive composition as claimed in claim 1, wherein said poly(vinyl alkyl ether) is poly(vinyl ethyl ether).

6. A radiation curable pressure sensitive adhesive composition as claimed in claim 1, wherein said poly(vinyl alkyl ether) has a reduced viscosity of from 0.2 to 0.6.

7. A radiation curable pressure sensitive adhesive composition as claimed in claim 1, wherein said liquid monoacrylate monomer is a carbamyloxy alkyl acrylate or carbamyloxy alkyl methacrylate.

8. A radiation curable pressure sensitive adhesive composition as claimed in claim 1, wherein said liquid monoacrylate monomer is N-methyl-2-carbamyloxy ethyl acrylate.

9. A radiation curable pressure sensitive adhesive composition as claimed in claim 5, wherein said liquid monoacrylate monomer is N-methyl-2-carbamyloxy ethyl acrylate.

10. A radiation curable pressure sensitive adhesive composition as claimed in claim 1, wherein said photoinitiator is benzophenone.

11. A radiation curable pressure sensitive adhesive composition as claimed in claim 9, wherein said photoinitiator is benzophenone.

12. A radiation curable pressure sensitive adhesive composition as claimed in claim 11, wherein said N-methyl-2-carbamyloxy ethyl acrylate is present at a concentration of from 35 to 50 weight percent, said poly(vinyl ethyl ether) is present at a concentration of from 50 to 65 weight percent, and said benzophenone is present at a concentration of from 2 to 3 weight percent.

13. A radiation curable pressure sensitive adhesive composition as claimed in claim 1, wherein said liquid monoacrylate monomer is cyclohexyl acrylate.

14. A radiation curable pressure sensitive adhesive composition as claimed in claim 1, wherein said liquid monoacrylate monomer is 2-ethoxyethyl acrylate.

15. A radiation curable pressure sensitive adhesive composition as claimed in claim 1, wherein said liquid monoacrylate monomer is isobornyl acrylate.

* * * * *